April 23, 1957 H. W. RIGGLE 2,789,493
BREATHERS AND VENTILATORS FOR HOUSES
Filed April 9, 1956
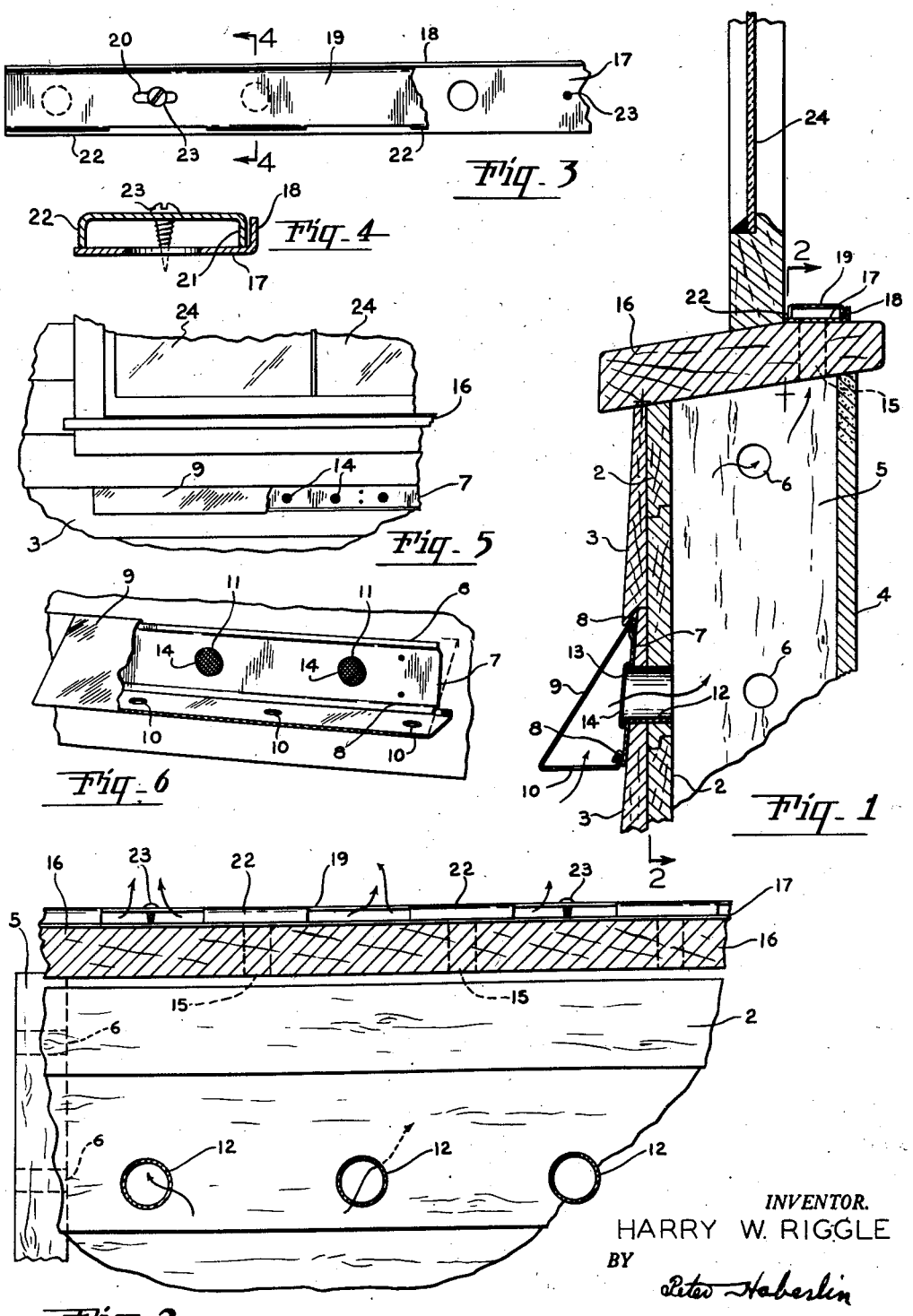
INVENTOR.
HARRY W. RIGGLE
BY
Peter Haberlin
ATTORNEY

United States Patent Office 2,789,493
Patented Apr. 23, 1957

2,789,493

BREATHERS AND VENTILATORS FOR HOUSES

Harry W. Riggle, Portland, Oreg.

Application April 9, 1956, Serial No. 577,056

1 Claim. (Cl. 98—88)

This invention relates to breathers and ventilators for houses, but more particularly to structures that may be installed in dwelling houses for the purpose of causing fresh air to circulate freely through all of the rooms, and the elimination therefrom of improper air qualities existing in enclosed spaces.

It is a recognized fact that air is capable of holding as a mechanical mixture with itself, varying quantities of vapor, depending upon its temperature. When there is mixed with air all of the water vapor it can hold, the air is "saturated," but air which is not fully saturated with readily absorb water vapor, since the process of evaporation converts the liquid to a vapor, while, if partly saturated air be reduced in temperature until the amount of moisture present corresponds to the amount which the air is capable of holding at the given temperature, it becomes saturated air.

Since houses are constructed of many hygroscopic materials, it is obvious that such materials absorb water vapor from the air, and unless some system of constantly circulating the air exists, these hygroscopic parts absorb sufficient water vapor to cause deterioration, and general decay of the structure.

This application may be considered as a further amplification of the application filed May 1, 1953, for Window Ventilators, and identified by Serial No. 352,524, now abandoned.

One object of the embodiment of this invention is to provide means for conducting the outside atmosphere through openings formed in the mechanical structure described herein, and also through apertures in certain parts of the housing structure; and further.

To provide means to normally expel contaminated air caused by the exhalation from the lungs of the occupants, such as carbon dioxide and other impurities, and again To provide means for the elimination of moisture produced by steam from cooking utensils, dish washing, bathing, and other forms of accumulated moisture, and yet.

To provide means to cause constant circulation of air throughout all of the rooms in a house in order to minimize the normal absorbtion of moisture by hygroscopic materials which form part of house structures, and again.

To provide means for expelling varying quantities of water vapor mixed with the air, which when it reaches the saturation point and "spills over," causes "weeping windows" and dripping ceilings.

Other advantages and objects will become apparent in the following specification and appended claim, which taken in connection with the accompanying drawing, form part of this application; of which Fig. 1 is a fragmentary section through a house, showing an embodiment of the invention in transverse section applied thereto.

Fig. 2 is a front elevation of same taken on line 2—2 of Fig. 1;

Fig. 3 is a fragmentary top plan view of the control means;

Fig. 4 is an enlarged transverse section taken on line 4—4 of Fig. 3;

Fig. 5 is a fragmentary front elevation of Fig. 1, and

Fig. 6 is a similar view, shown in perspective.

Now with more detailed reference to the drawing, the numeral 2 indicates the outer wall of a house covered by clapboards 3 and separated from inner wall 4 by vertical studs 5, which have holes 6 drilled therethrough for the entrance of air into the stud space.

A metal plate 7, having a plurality of apertures passing therethrough is affixed to one of the clapboards, after which holes are drilled through said clapboard and outer wall concentric with the apertures in order to admit air into the stud spaces, while guides 8 are formed on the longitudinal edges of metal place 7, to support triangular cover 9 which is longitudinally movable on said guides, while the base of said triangular cover has punched therethrough a plurality of holes 10 in staggered relation with the apertures 11, in metal plate 7, while thimbles 12, having flanges 13 formed thereon and covered by wire meshes 14, to prevent the ingress of insects are inserted through apertures 11, which lead into the stud space.

The ends of cover 9 are open for the purpose of admitting the horizontal flow of air across the space without said cover until it is directed through thimbles 12, thence upwardly through holes 15 defined in window sill 16, which is supported on and permanently affixed to walls 2 and 4, as shown in Fig. 1.

For the purpose of controlling the flow of air and preventing direct drafts into rooms, a regulator is attached to each window sill, comprising a base plate 17, having an upturned lip 18, formed on the inner edge thereof; and having apertures that register with holes 15 in window sill 16, while a shuttle 19 defining oblong slots 20 rests on said base plate by means of downturned edge 21 and feet 22, which have spaces intermediate thereof in order to direct the flow of air toward window pane 24, while screws 23 pass through slots 20 and base plate 17 until the shoulders of the heads of said screws register with the upper surface of shuttle 19.

In order to operate the disclosed embodiment of this invention, the air flows through the ends of cover 9 and horizontally across the space defined between said cover and metal plate, and upwardly through the apertures in its base, where it flows through thimbles 12, into the stud spaces and through openings 6 in said studs; thence upwardly through the holes in window sill 16 and base plate 17, where it is directed toward window pane 24 through the spaces formed intermediate feet 22, of shuttle 19.

It is obvious from the foregoing description that a house having a continuous flow of outside air passing therethrough from the basement to the attic, and having proper outlets for the exhaust of vapor and polluted air, can be kept dry and comfortable without causing drafts through the rooms.

Experiment and tests with the structure set forth in this application has shown that since fresh air warms faster than dead stale air, a great economy in fuel has been noted.

While the structure has been described in detail and with specific illustrations, it is to be understood that other modifications in construction and arrangements of parts may be devised without departing from the spirit and scope of the invention. The present embodiment is illustrative but not restrictive, since the scope and purview of the invention is indicated by the appended claim rather than by the foregoing description.

Having thus fully described and illustrated a preferred embodiment of the invention in a manner that may enable others skilled in the art to which it appertains to construct and use the same, what is claimed and desired to be secured by Letters Patent is:

The combination with a building structure having outer apertured walls and inner walls, apertured studs separating said walls and defining stud spaces, and apertured window sills affixed to said walls; with metal plates defining apertures therethrough which register with the apertures through said outer walls, thimbles inserted through said apertures, wire meshes covering the outer ends of said thimbles, guides formed on the horizontal edges of said metal plates, a detachable triangular cover supported by said guides, and defining openings in the base thereof in staggered relation with the wall apertures for the purpose of admitting the flow of air through the thimbles into the stud spaces and through the studs, apertured base plates affixed to the window sills, shuttles having downturned edges and downturned feet defining spaces which direct the flow of air from the rooms toward the windows.

References Cited in the file of this patent
UNITED STATES PATENTS

| | | |
|---|---|---|
| 327,414 | Scharnweber | Sept. 29, 1883 |
| 1,334,806 | Sherwood | Mar. 23, 1923 |
| 2,489,415 | Hyde | Nov. 29, 1943 |
| 2,553,866 | Olson et al. | May 22, 1951 |